United States Patent [19]

Ikeda et al.

[11] 3,997,720
[45] Dec. 14, 1976

[54] OPTICAL PICTURE RECORDING SYSTEM

[75] Inventors: Takatoshi Ikeda; Toshio Tsubaki, both of Hitachi, Japan

[73] Assignee: Hitachi, Ltd., Japan

[22] Filed: Apr. 16, 1974

[21] Appl. No.: 461,430

[30] Foreign Application Priority Data

Apr. 18, 1973 Japan .............................. 48-43152

[52] U.S. Cl. .............................. 178/7.4; 178/6.6 R; 178/6.6 A; 178/6.7 R; 346/161; 346/110 R; 355/20

[51] Int. Cl.² .............................. H04N 1/22

[58] Field of Search .................. 178/15, 7.4, 6.7 R, 178/6.7 A, 6.6 R, 6.6 A, 7.85; 340/173 CR, 173 LM; 346/74 CR, 74 ES, 74 EB, 74 P, 110; 355/20; 179/100.3 A

[56] References Cited

UNITED STATES PATENTS

| 2,590,956 | 4/1952 | Gille | 179/100.3 A |
| 3,303,280 | 2/1967 | Fox et al. | 178/6.6 A |
| 3,605,593 | 9/1971 | Anderson | 355/20 |

OTHER PUBLICATIONS

Bliss, Application of Cathode Ray Tubes in Facsimile, Paper No. 7.4, pp. 44–50, Convention Record of the IRE, Part 8, Mar. 22–25, 1954.

Primary Examiner—Raymond F. Cardillo, Jr.
Attorney, Agent, or Firm—Craig & Antonelli

[57] ABSTRACT

An optical picture recording system is constructed such that the lens is a linear lens, and the linear lens or the cathode ray tube is moved so as to confront the electron beam from the cathode ray tube with the linear lens at all times while, when recording one frame, the recording paper is moved in synchronism with movement of the linear lens or the cathode ray tube.

6 Claims, 9 Drawing Figures

OPTICAL PICTURE RECORDING SYSTEM

BACKGROUND OF THE INVENTION

The present invention relates to an optical picture recording system for recording a picture formed by line-scanning.

The conventional system of this kind is roughly classified into two; one group is of such a type that the picture formed on the fluorescent screen of the cathode ray tube is recorded on the recording paper through a lens, and the other group is such a type that contact recording is made through an optical fiber tube. However, those conventional systems have drawbacks. That is, in the former group, there are drawbacks in that extremely poor is the efficacy of the utilization of the light energy emitted from the fluorescent substance, and picture distortion is apt to occur. In the latter group, the drawback is that the optical fiber tube is very expensive and thus the recording system is expensive.

SUMMARY OF THE INVENTION

In the light of the drawbacks of the optical picture recording systems of the prior art, the object of the present invention is to provide a small and inexpensive optical picture recording system having high efficiency in the utilization of the light from the fluorescent screen.

To accomplish such object of the present invention, the present invention is constructed in such a way that a linear lens is employed for the lens system and the linear lens or the cathode ray tube is moved so as to confront the electron beam from the cathode ray tube with the linear lens.

The present invention will appear more clearly from the following description when taken in connection with the accompanying drawings, showing by way of example, preferred embodiments of this inventive idea.

DESCRIPTION OF THE PREFERRED EMBODIMENTS

Figure 1:
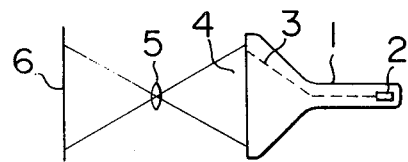
FIG. 1 is a schematic diagram of a prior art optical picture recording system illustrating its principle.
Figure 2:
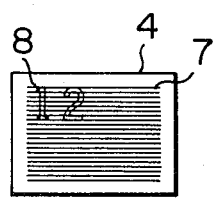
FIG. 2 is a diagram for illustrating the picture formation of the cathode ray tube.

The present invention will be described in detail in comparison with a conventional picture recording system. The conventional picture recording system, as shown in FIGS. 1 and 2, is arranged such that the electron beam 3 emitted from the electron gun 2 of the cathode ray tube 1 is deflected to form a raster on the fluorescent screen 4, while at the same time the raster is varied in the brightness in accordance with the electrical signal reflecting the image to be screened, thus visualizing the character 8, for example, on the fluorescent screen, and the optical image of the character formed on the fluorescent screen is recorded on a photosensitive medium 6 through a lens 5.

In this case, the distance between the fluorescent screen and the photosensitive medium is $4f_1$, provided that the focal length of the lens 5 is $f_1$, and the ratio of the images on the fluorescent screen and the photosensitive medium is 1 : 1.

Figure 3:
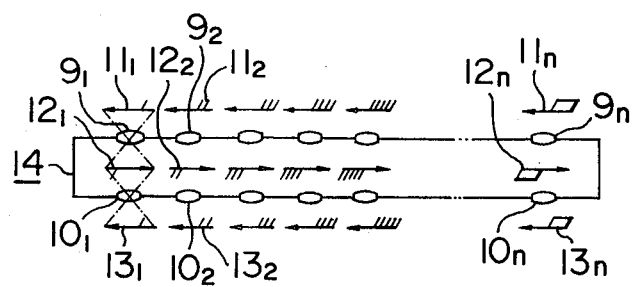
FIG. 3 is a diagrammatic view illustrating the principle of a linear lens.

A linear lens used in the present invention will next be described in detail with reference to FIG. 3. In the figure, there is shown the linear lens 14 comprising a pair of small lens groups, each of which consists of n small lenses arranged in a line, i.e. $9_1, 9_2 \ldots, 9_n$ and $10_1, 10_2, \ldots, 10_n$. The elemental small lenses 9 and 10 have the same focal length of $f_2$, and are separated by the distance of $4f_2$.

When an object 11 is disposed in front of the elemental small lens 9, for example, of the linear lens 14 at the position distanced from the lens 9 by $2f_2$, the object is formed through the lenses $9_1 \ldots 9_n$ into mosaic inverted images $12_1 \ldots 12_n$ which in turn is inverted again through the elemental small lens 10 to form erect images $13_1 \ldots 13_n$ in the rear of the lens 10 at the position distanced from the lens 10 by $2f_2$. Accordingly, the final image is separated from the object by $8f_2$. If the relative aperture of the conventional lens 5 and the linear lenses 9 and 10 are of the same, then the equation $f_2 = f_1/n$ holds, and hence, $8f_1/4f_1 . n = 2/n$. Thus, when comparing the linear lens with the conventional lens shown in FIG. 1, the distance between the object and the final image is short. That is, the linear lens has a large relative aperture relative to resolution because the linear object is positioned near the optical axis, if it is constructed by a number of lenses with small width lying closely side by side in a line. A larger light energy from the cathode ray tube 1 is emitted in the direction normal to the fluorescent screen 4 due to the metal backing of the fluorescent screen. On the other hand, the linear lens 14 may be arrayed in opposition to the raster on the fluorescent screen and thus enables the light to transmit effectively therethrough. Thus, the linear lens 14 is substantially brighter when compared with that of the prior art.

In the case where an arrangement is employed in the picture recording system in which a single raster is always formed on the fluorescent screen, the linear lens is disposed in opposition to the raster and the recording paper is also disposed at the position where the image is formed through the linear lens, even though the linear lens having such advantage is used, the life of the fluorescent screen is adversely affected due to the fact that the electron beam 3 concentrates upon the single raster on the fluorescent screen 4. To avoid such influence on the life of the fluorescent screen, a reduction of brightness decreasing the light energy is required. However, if the brightness is reduced, the merit of the linear lens can not be utilized sufficiently.

Figure 4:
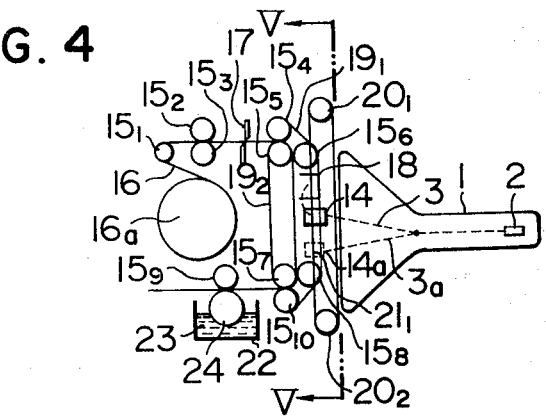
FIG. 4 is a schematic view of an embodiment of the optical picture recording system according to the present invention.
Figure 5:
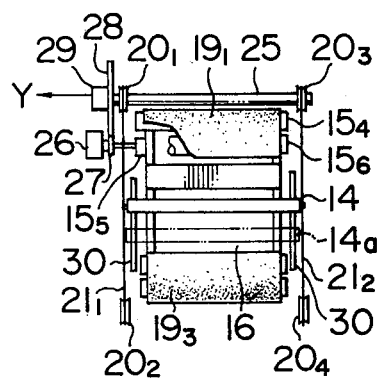
FIG. 5 is a sectional view taken along the line V—V of FIG. 4.

A description will be made hereinafter, with reference to FIGS. 4 to 7, about an embodiment of the recording system constructed so as to bring into full play the merit of the linear lens 14. In FIG. 4, a recording paper 16 is caused to travel by means of a group of rollers $15_1 \ldots 15_{10}$ and belts $19_1 \ldots 19_3$. More particularly, the recording paper 16 with zinc oxide being wound into a roll $16_a$ runs through a cutter 17, on the belt $19_2$ where the recording paper is opposite to the cathode ray tube 1 with an intervention of the linear lens 14, and finally through the developing device comprising a developing roller 24, a developing tank 22, developing solution 23, and the roller $15_9$ for holding the recording paper. The reference numeral 18 designates an electrifying device which is disposed so as to confront with the recording paper 16 preceding to the linear lens 14. The shaft of the paper feeding roller $15_5$ is coupled through a clutch 26 with a pinion 27 intermeshing with a gear 28. The pulleys $20_1$ and $20_3$ mounted to the shaft 25 of the gear 28 and loose pulleys $20_2$ and $20_4$ are linked with wires $21_1$ and $21_2$, respectively. The linear lens 14 is fixed to the wires $21_1$ and $21_2$ in order that the linear lens moves vertically in accordance with forward and backward rotations of the shaft 25 of the gear.

When a starting switch (not shown) is turned on, the roller group $15_1 \ldots 15_{10}$ starts to operate and the electrifying devices 18 also is made conductive. When the top end of the recording paper 16 reaches the uppermost portion of the linear lens 14, the clutch 26 is driven to move the linear lens 14 until the lowermost portion of the linear lens is confronted with the rear end of the recording paper 16 at which the recording paper is cut out by the cutter 17. The recording paper also continues to advance when the linear lens 14 moves, though the former moves in the direction opposite to one of the latter. As can be seen from the foregoing description, the advancing of the linear lens 14 is performed through the assembly comprising the pinion 27, the gear 28, the pulleys $20_1$ and $20_3$, wires $21_1$ and $21_2$, etc. The rollers $15_2$ and $15_3$ stop in their operation when the cutter 17 operates.

Figure 7:
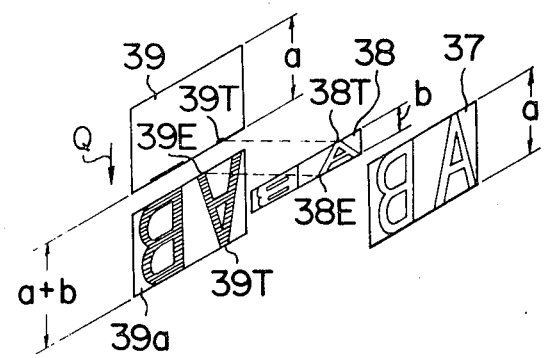
FIG. 7 diagrammatically shows a process of forming a recording picture by the system of FIG. 4.

The electron beam 3 is swept as the linear lens advances, thereby resulting in the operation as shown in FIG. 7. That is, the original picture 37 with the longitudinal length $a$ is vertically swept in the upper direction by the longitudinal length $b$ of the fluorescent screen 38. At this time, the raster image is formed on the recording surface 39 at the same height as the raster, since the linear lens 14 is disposed at the position corresponding to that of the raster, as described above. The recording surface 39 advances by the distance $a + b$ when the first raster of 38T on the fluorescent screen 38 appears at the same level with the lowermost end 39T of the recording surface 39, and the last raster 38E on the fluorescent screen 38 relatively moves to reach the upper end 39E of the recording surface 39 moved. In FIG. 7, the recording surface 39 is arranged to move from top to bottom, as shown by an arrow Q. However, in case where it moves inversely from bottom to top, the distance where the recording surface 39 advances by one frame is $a - b$.

Figure 6:
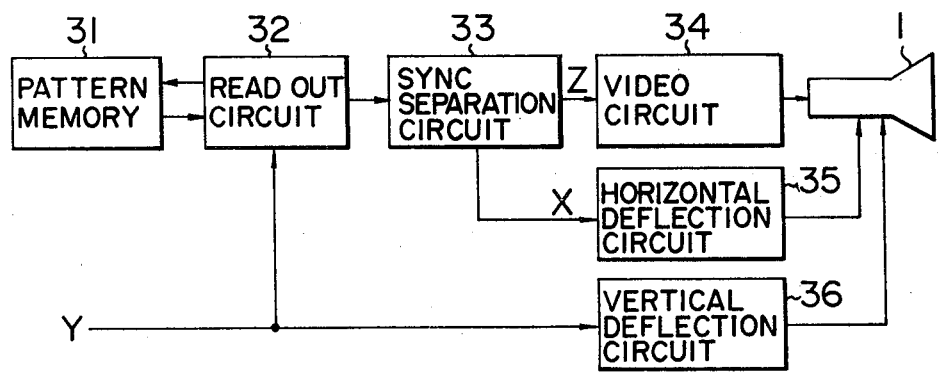
FIG. 6 is a block diagram for forming a picture used together with the system of FIG. 4.

The synchronizing operation of the electron beam 3 is based on the detection of the position of the linear lens 14. More specifically, the position of the linear lens 14 is detected by means of a potentiometer 29 directly coupled with the gear 28, and the detected position of the linear lens is used to perform a vertical sweep in the cathode ray tube 1. As shown in FIG. 6, the output of Y of the potentiometer 29 is applied to a read-out circuit 32 for reading out the desired raster signal from a pattern memory 31 and the vertical deflection circuit 36. The raster signal read out is applied to the cathode ray tube 1 through a video circuit 34 and a horizontal deflection circuit 35, after being separated into a video signal $z$ and a horizontal synchronizing signal $x$ through a sync separation circuit 33.

The recording paper 16 thus recorded by one frame is continuously developed at the developing roller 24 and is sent out to external. When the linear lens 14 reaches the lowermost portion, the clutch 26 is released to permit the linear lens 14 to return to the uppermost portion by the aid of the spring fixed to the shaft 25. Then, all the power sources for the picture recording system is cut off and the picture recording system returns to the initial state of a stand-by.

Figure 8:
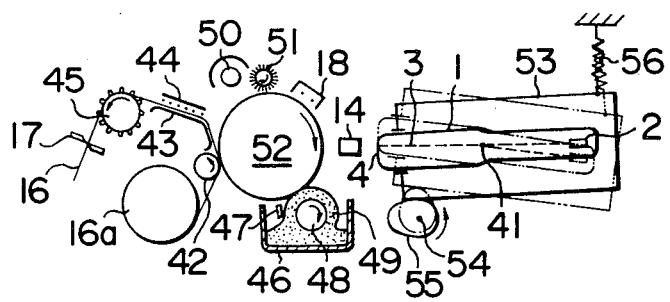
FIG. 8 is a schematic view of another embodiment of the present invention.

A next description will be made, with reference to FIG. 8, about another embodiment according to the transferring method using a photoconductive drum. In this modified embodiment, an arrangement is employed in which the linear lens 14 is fixed while the cathode ray tube 1 is movable. Essential parts for the picture recording system are disposed in order of the cathode ray tube 1, the linear lens 14, the photoconductive drum 52, and the recording paper roll $16_a$. The photoconductive drum 52 is provided therearound with a linear lens 14, a developing portion comprising a developing box 46, a shaping plate 47, a magnet-roll 48, and developing powder 49, a transferring roller 42 to transfer the developing toner onto the recording paper 16 from the recording paper roll $16_a$ by bringing the recording paper into pressure contact with the photoconductive drum 52, a lamp 50 for removing the remaining electrification, a cleaner 51 for removing the residual toner, and an electrifying device 18 for electrifying the photoconductive drum 52. In the figure, the reference numeral 43 is a paper guide, 44 a heater for fixation, and 45 a sprocket for sending out the recording paper.

The cathode ray tube 1 is so arranged that it may be rotatable in a small angle around the center corresponding to the point 41 where the vertical deflection is made, and the vertical deflection is controlled so as to maintain the relation of confronting the raster with the linear lens irrespective of the rotation of the cathode ray tube. That is, the horizontal and the vertical sweep is performed by detecting the rotating angle of the cathode ray tube.

Figure 9:
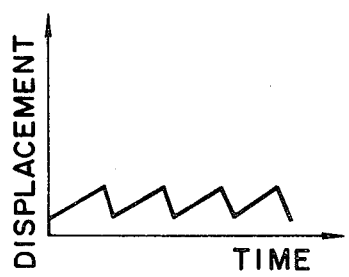
FIG. 9 is an illustration for explaining the displacement of a cam.

An operation of this embodiment will be described below. The photoconductive drum 52 is exposed one frame, and is developed through the developing portion including the magnet roll 48, etc., the latent image formed thereon is transferred to the recording paper 16 by the transferring roller 42, and finally the residual toner on the photoconductive drum is cleaned through the lamp 50 and the cleaner 51. The image-transferred recording paper 16 goes under the heater 44 for fixation of the transferred image, is sent out by the sprocket 45, and then the paper is cut by the cutter 17 thereby to complete a sheet of copy. A frame 53 is arranged to be rotatable with a shaft disposed at the deflecting point 41. The potentiometer 29 may be attached to the shaft. The lower side of the front portion of the frame 53 is slidably supported by a rotating cam 55 with its shaft 54 while the frame 53 is provided at its rear portion with a spring 56 serving to rotate the frame into the position of the cam 55. The photoconductive drum 52 and the cam 55 are interconnected through the gear, the timing belt, etc. in order that the drum and the cam rotate at the same rotational speed. The cam 55 is so shaped that the fluorescent screen 4 displaces up and down as shown in FIG. 9, while the deflection current of the cathode ray tube 1 varies in accordance with the displacement shown in FIG. 9. Thus, the cathode ray spot on the fluorescent screen 4 may be synchronizingly positioned so as to confront with the linear lens 14 at all times.

It is said that the life of the fluorescent screen is about 3,000 hours when it is hit with the electron of the time averaged electron beam energy of 11 $mW/cm^2$ measured at the luminous portion. The current required to obtain such electron beam energy is such that a beam current to sweep only one line is 0.07 $\mu A$ when the length of the raster is 200 mm, the spot diameter is 0.1 $\phi$, and the accelerating voltage is 25 KV. Accordingly, poor brightness may be obtained. Contrary to this, according to the embodiment of the present invention, a sufficient brightness may be obtained since the beam current up to 7 $\mu A$ is permitted to flow, provided that the width of sweeping is 10 mm.

Furthermore, the size of the optical system alone may be reduced to be 1/20 compared with the conventional one, when a linear lens 14 of 210 mm length × 10 mm height × 10 mm width is employed. For this, the reduction of size of the picture recording system is feasible.

From an economical view point, an improvement is attained, for example, such that when a cheap cathode ray tube 1 is employed and it is damaged, alternation is permissible for the damaged cathode ray tube, and a relatively cheap induction motor may be used instead of the expensive driving means such as a pulse motor.

Moreover, according to the present invention, only the center portion of the fluorescent screen of the cathode ray tube may be used so that distortion and blur occurring at the periphery of the screen is eliminated, thereby obtaining a recording picture of high quality, and the present invention enables the image of the cathode ray tube to be formed on the solid such as the photoconductive drum 52.

It can be seen from the foregoing description that the present invention provides a small and inexpensive optical picture recording system capable of recording a clear picture with high efficiency.

Many modifications of the disclosure will be apparent to those skilled in the art for practicing the advantages of the invention which is defined by the appended claims.

We claim:
1. An optical picture recording system comprising
a cathode ray tube having a fluorescent screen upon which a picture is formed by a scanning electron beam;
a recording medium having a surface upon which an image of said picture can be recorded in response to said scanning electron beam of said cathode ray tube;
a linear lens, disposed between said cathode ray tube and said recording medium, through which said image is projected from said cathode ray tube toward said recording medium prior to being recorded on said surface of said recording medium; and
means for synchronously moving one of said cathode ray tube and said linear lens relative to the other such that said linear lens continually confronts said scanning electron beam from said cathode ray tube,
wherein said means for moving enables said linear lens to move and said cathode ray tube to remain stationary, and
wherein said means for moving includes potentiometer means for detecting the position of said linear lens so that the movement of said linear lens can be synchronized with the movement of said scanning electron beam in a predetermined manner.

2. An optical picture recording system comprising
a cathode ray tube having a fluorescent screen upon which a picture is formed by a scanning electron beam;
a recording medium having a surface upon which an image of said picture can be recorded in response to said scanning electron beam of said cathode ray tube;
a linear lens, disposed between said cathode ray tube and said recording medium, through which said image is projected from said cathode ray tube toward said recording medium prior to being recorded on said surface of said recording medium; and
means for synchronously moving one of said cathode ray tube and said linear lens relative to the other such that said linear lens continually confronts said linear lens continually confronts said scanning electron beam from said cathode ray tube,
wherein said means for moving enables said linear lens to move and said cathode ray tube to remain stationary, and
further comprising means for moving said recording medium in synchronism with the movement of said linear lens, said recording medium being moved a distance of $a + b$, where $a$ is the length of the picture on said recording medium and $b$ is the length of the picture on said fluorescent screen.

3. An optical picture recording system comprising
a cathode ray tube having a fluorescent screen upon which a picture is formed by a scanning electron beam;
a recording medium having a surface upon which an image of said picture can be recorded in response to said scanning electron beam of said cathode ray tube;
a linear lens, disposed between said cathode ray tube and said recording medium, through which said image is projected from said cathode ray tube toward said recording medium prior to being recorded on said surface of said recording medium; and
means for synchronously moving one of said cathode ray tube and said linear lens relative to the other such that said linear lens continually confronts said scanning electron beam from said cathode ray tube,
wherein said means for moving enables said linear lens to move and said cathode ray tube to remain stationary, and
further comprising means for moving said recording medium in synchronism with the movement of said linear lens, said recording medium being moved a distance of $a - b$, where $a$ is the length of the picture on said recording medium and $b$ is the length of the picture on said fluorescent screen.

4. An optical picture recording system comprising:
a cathode ray tube having a fluorescent screen on which a picture is formed by scanning lines of an electron beam being deflected by respective horizontal and vertical deflection means;
a photosensitive recording medium disposed opposite to said fluorescent screen for recording an image of said picture;

a linear lens disposed between said fluorescent screen and said recording medium for projecting said image from said fluorescent screen onto said recording medium, said linear lens having the longitudinal length dimension parallel to the direction of horizontal scanning;

drive means for moving said linear lens in the direction of vertical scanning; and synchronizing means associated with said drive means and said deflection means for synchronizing the movement of said linear lens concurrent with vertical scanning from each horizontal scanning line, and further comprising means for moving said recording medium in the direction of said vertical scanning in synchronism with the vertical movement of said linear lens, said recording medium being moved a distance at the completion of the recording of the picture of $a + b$, where $a$ is the length of the picture on said recording medium in the vertical scanning direction and $b$ is the length of the picture on said fluorescent screen.

5. An optical picture recording system comprising:

a cathode ray tube having a fluorescent screen on which a picture is formed by scanning lines of an electron beam being deflected by respective horizontal and vertical deflection means;

a photosensitive recording medium disposed opposite to said fluorescent screen for recording an image of said picture;

a linear lens disposed between said fluorescent screen and said recording medium for projecting said image from said fluorescent screen onto said recording medium, said linear lens having the longitudinal length dimension parallel to the direction of horizontal scanning;

drive means for moving said linear lens in the direction of vertical scanning; and synchronizing means associated with said drive means and said deflection means for synchronizing the movement of said linear lens concurrent with vertical scanning from each horizontal scanning line, and further comprising means for moving said recording medium in the direction of said vertical scanning in synchronism with the vertical movement of said linear lens, said recording medium being moved a distance at the completion of the recording of the picture of $a - b$, where $a$ is the length of the picture on said recording medium in the vertical scanning direction and $b$ is the length of the picture on said fluorescent screen.

6. An optical picture recording system comprising:

a cathode ray tube having a fluorescent screen on which a picture is formed by scanning lines of an electron beam being deflected by respective horizontal and vertical deflection means;

a photosensitive recording medium disposed opposite to said fluorescent screen for recording an image of said picture;

a linear lens disposed between said fluorescent screen and said recording medium for projecting said image from said fluorescent screen onto said recording medium, said linear lens having the longitudinal length dimension parallel to the direction of horizontal scanning;

drive means for moving said linear lens in the direction of vertical scanning; and synchronizing means associated with said drive means and said deflection means for sychronizing the movement of said linear lens concurrent with vertical scanning from each horizontal scanning line, and wherein said synchronizing means includes potentiometer means for producing a signal representative of the position of movement of said linear lens, and wherein means are provided for supplying said signal to said deflection means.

* * * * *